(12) United States Patent
Friesel

(10) Patent No.: US 8,134,492 B1
(45) Date of Patent: *Mar. 13, 2012

(54) METHOD FOR SCANNING A RADAR SEARCH VOLUME WITHIN AN ALLOWABLE SCAN TIME

(75) Inventor: Mark A. Friesel, Ewing, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 102 days.

This patent is subject to a terminal disclaimer.

(21) Appl. No.: 12/208,588

(22) Filed: Sep. 11, 2008

(51) Int. Cl.
*G01S 13/00* (2006.01)
(52) U.S. Cl. .......................... 342/95; 342/147; 342/165
(58) Field of Classification Search .................. 342/95
See application file for complete search history.

(56) References Cited

U.S. PATENT DOCUMENTS

| | | | |
|---|---|---|---|
| 4,467,447 A | 8/1984 | Takahashi et al. | |
| 5,890,012 A | 3/1999 | Poisner | |
| 7,184,036 B2 * | 2/2007 | Dimsdale et al. | 345/419 |
| 7,221,307 B1 | 5/2007 | Friesel | |
| 2006/0202886 A1 * | 9/2006 | Mahapatra et al. | 342/176 |
| 2007/0018882 A1 * | 1/2007 | Manoogian et al. | 342/80 |
| 2008/0153414 A1 * | 6/2008 | Ho et al. | 455/12.1 |
| 2008/0210016 A1 * | 9/2008 | Zwirn et al. | 73/861.18 |

* cited by examiner

*Primary Examiner* — Timothy A Brainard
(74) *Attorney, Agent, or Firm* — Howard IP Law Group, PC

(57) ABSTRACT

A radar volume in a cued direction is searched with sequential pencil beams. The allowable scan time is limited. The cued direction and uncertainty identify a search face, and the range gives a search volume. The number of beams required to scan the volume is determined, and compared with the maximum time. If less than the maximum, the scan is initiated. If greater than the maximum time, the scan region about the cued volume is subdivided into smaller portions, each of which is scanned sequentially.

18 Claims, 7 Drawing Sheets

METHOD FOR SCANNING A RADAR SEARCH VOLUME WITHIN AN ALLOWABLE SCAN TIME

BACKGROUND OF THE INVENTION

SPY is a naval radar system which searches space under control of command and decision processing. It searches by means of a plurality of sequential directional beams which may be pointed in a given direction. Command and Decision determines the acquisition face (volume) to be searched. The radar beam is directed to each angle so as to cover the entire search face. This type of searching is subject to time constraints, as the beam must dwell at the current beam angle for a sufficient time for the transmitted radar signals or pulses to travel to the target, which might be at the maximum allowable range, and for the reflection to return to the radar. The round-trip time is the well-known 12.4 microseconds per mile of target range. Thus, the beam must dwell at each angle of the search face for a sufficient length of time to detect a target at the maximum range, and then move on to the next angle within the search beam pattern.

Because of the need to keep the radar system in use, as when searching multiple volumes in the case of multiple potential targets, it is necessary to limit the amount of time spent searching a given volume. The system aborts the search of a volume of space after a given time. Consequently, a search through a volume of space may be initiated and aborted without being completed. This operation may result in a failure to locate a target within the specified scan volume. In order to avoid having a scan aborted and the resulting problems, it is imperative that the searching of any given volume be performed in the least possible time.

The Spy radar can operate in a volume search mode. When information becomes available from another source, such as a cooperating radar, about the possible presence of a target in a nominal given direction or location, it may be desired to examine a volume about the nominal given direction in an attempt to acquire the target. This is termed a "cued" search. If the selected volume is too large, the search may time-out before completion of the search, and if too small, may not find the relevant target(s).

Improved or alternative arrangements are desired for establishing the angular extent of the search volume about the cued nominal direction of a target to guarantee that the search can be accomplished within given time constraints.

SUMMARY OF THE INVENTION

A method according to an aspect of the invention is for searching an angular region of the radar acquisition or search volume about a given cued direction and with a given maximum search range. The radar search of the designated volume is performed with sequentially generated radar beams having defined beamwidths. The method comprises the steps of acquiring the nominal track position and velocity (cue information) and time, and error information describing the uncertainty in the cue information. This error information may be presented together with the cue information. From the error information, the azimuth and elevation extent (the acquisition or search face) of the search volume about the cue direction is determined. If necessary, the angular extent of each beam in the azimuth and elevation directions are determined from the beamwidths. From the angular extents in azimuth and elevation for each beam, the number of beams required to cover the acquisition face is determined [equation 1]. The dwell time for each of the beams is determined from the search range. The search time is determined as the product of the number of beams multiplied by the dwell time per beam. The search time is compared with the maximum allowable search time, and radar scanning over the acquisition face is initiated with the calculated number of beams if the search time is less than the maximum allowable search time. The acquisition or search face is partitioned into sub-search-faces if the search time is greater than the maximum allowable search time. Sequential radar scanning of each of the sub-search-faces is initiated. In a preferred mode of the method, the number of beams N is calculated as $$N = \left[1 + 2flr\left(\left(\frac{A_{ext}}{2\Delta A}\right)+\left(\frac{1}{2}\right)\right)\right]\left[1 + 2flr\left(\left(\frac{E_{ext}}{2\Delta E}\right)+\left(\frac{1}{2}\right)\right)\right] + \quad (1)$$
$$4\left[1 + flr\left(\frac{A_{ext}}{2\Delta A}\right)\right]\left[1 + flr\left(\frac{E_{ext}}{2\Delta E}\right)\right]$$

where:
$A_{ext}$ is half the total azimuth extent of the search face;
$E_{ext}$ is half the total elevation extent of the search face;
$\Delta A$ is the azimuthal beam separation at constant elevation;
$\Delta A = (\beta/2)\cos\alpha$, where $\beta$ is the beam width and $\alpha$ is derived from the beam placement pattern, and is typically equal to 30 degrees. More specifically, $\alpha$ is equal to ½ the acute angle between the two lines that extend from the center of a radar beam to the points of intersection of the circumference of the beam with the circumference of an adjacent beam;
$\Delta E$ is the elevation separation of the line of centers of the horizontal rows;
$\Delta E = (\beta/2)(1+\sin\alpha)$; and
flr is a floor function that truncates the argument to the highest integer less than the argument.

DESCRIPTION OF THE INVENTION

Prior arrangements for determining the number of beams required in a fixed pattern about the cued direction have tended to give numbers that, in some cases, were greater than desired. As a result, the cued searching of the radar in these cases might exceed the maximum search time, thereby causing the search to be aborted.

Figure 1:
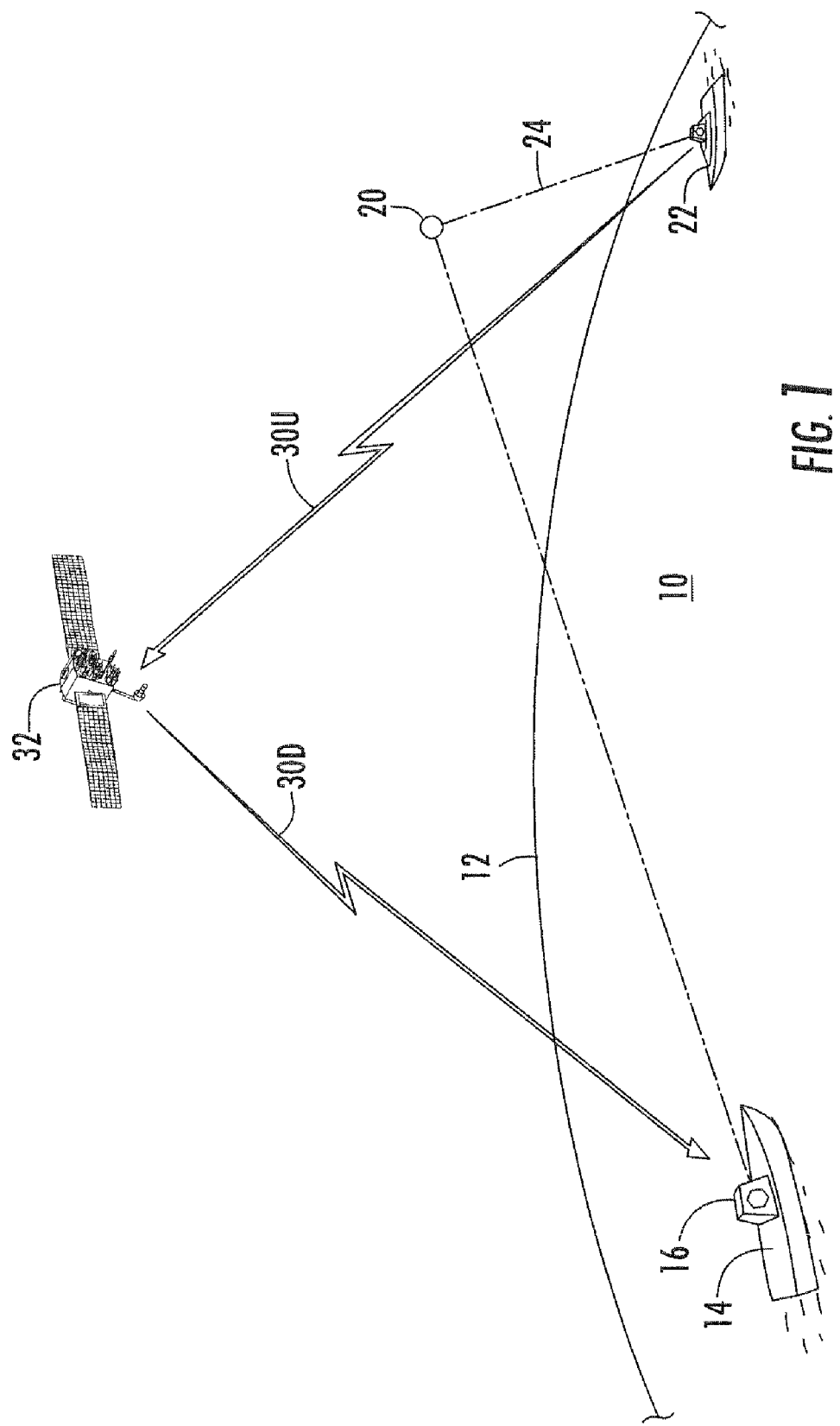
FIG. 1 is a simplified representation of a scenario in which a radar-equipped ship receives cue information relating to a target from a remote sensor.

In the scenario 10 of FIG. 1, a line 12 defines the horizon. A ship (ownship) 14 carries a radar system, portions of which are illustrated as 16. A target 20 is at a distance from ownship 14, and is observed along a line-of-sight 24 by means of sensors (not separately illustrated) mounted on a ship 22. Ship 22 obtains information about the location of target 20. Since ship 14 (and possibly other ships and assets associated with ship 22) may not be aware of the presence of target 20, ship 22 transmits coordinates of the target to other assets and in particular to ship 14. This transmission may be made by any communication path, such as, for example, the uplink 30U and downlink 30D associated with a communication spacecraft 32. Processing aboard ship 22 may evaluate the quality of the target, and transmit target quality or error information together with the target coordinates.

Figure 2:
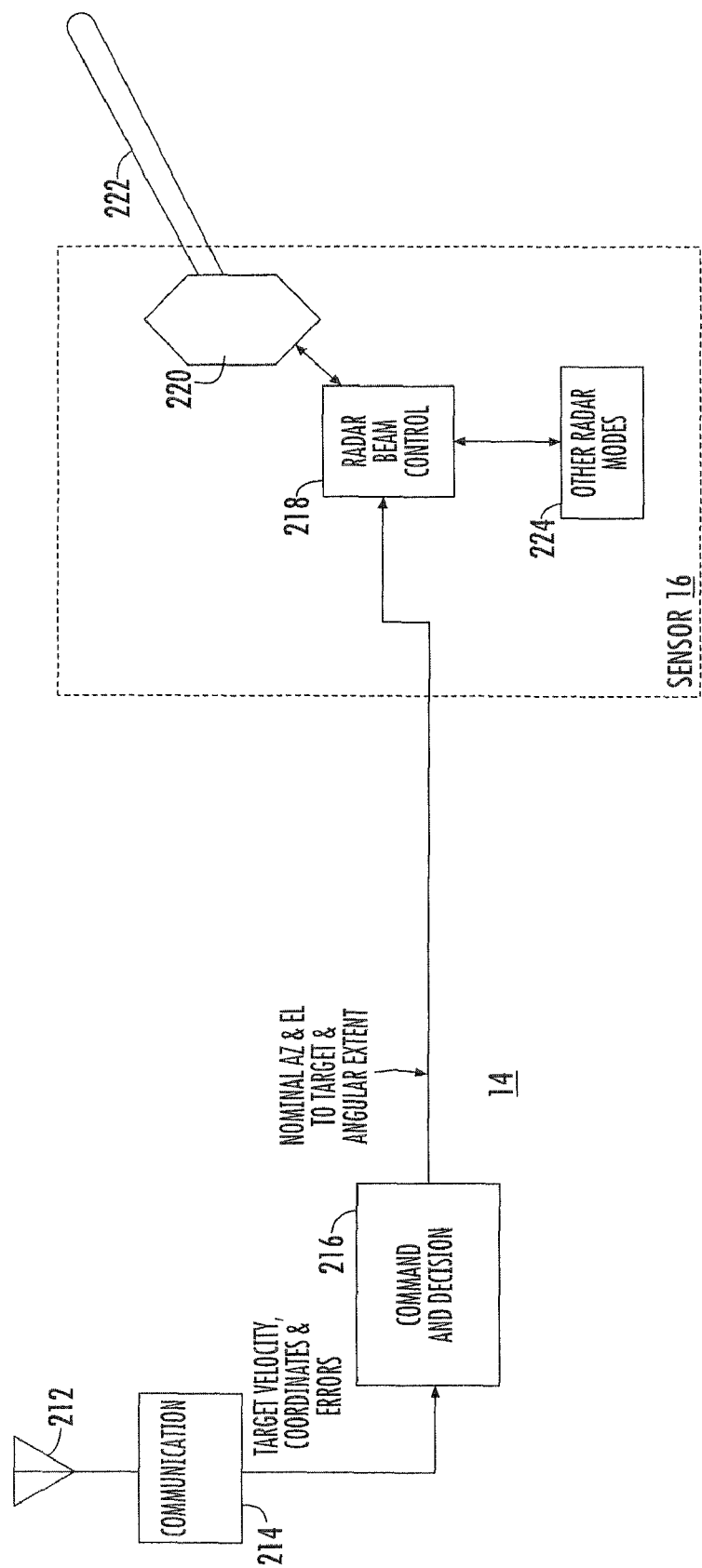
FIG. 2 is a simplified block diagram illustrating various shipboard functions relating to sensor acquisition of the target of FIG. 1.

In FIG. 2, ship 14 includes a communication antenna 212 which is intended for communication with other assets, including the communication represented in FIG. 1 by path 300. This communication, including information relating to the location of target 20 and the errors associated with the location, is coupled to a command and decision function, illustrated as a block 216. Block 216 of ship 14 processes the location information from ship 22 of FIG. 1, and from this location information determines the target azimuth and elevation angle relative to ownship 14, and the azimuth and elevation extent of the search or acquisition face required to acquire the target with its own sensors.

The target azimuth and elevation relative to ownship 14 of FIG. 2, and the azimuth and elevation extent of the acquisition face (see FIG. 3A) required by the errors in target azimuth and elevation, are transmitted from Command and Decision block 216 to an ownship radar beam control illustrated as a block 218. Radar beam control 218 commands the generation of transmit and receive beams by antenna face 220. These beams are "pencil" or narrow beams, as known in the art. A representative pencil beam is illustrated as 222. Radar beam control 218 may also receive commands from other functional modes, such as wide-area search modes, illustrated together as a block 224.

The radar beam controller 218 of FIG. 2, together with the antenna face 220, produces sequential pencil beams in directions which, in conjunction with other pencil beams, suitably search the volume of space defined by the combination of an acquisition face in conjunction with the desired range.

Figure 3A:
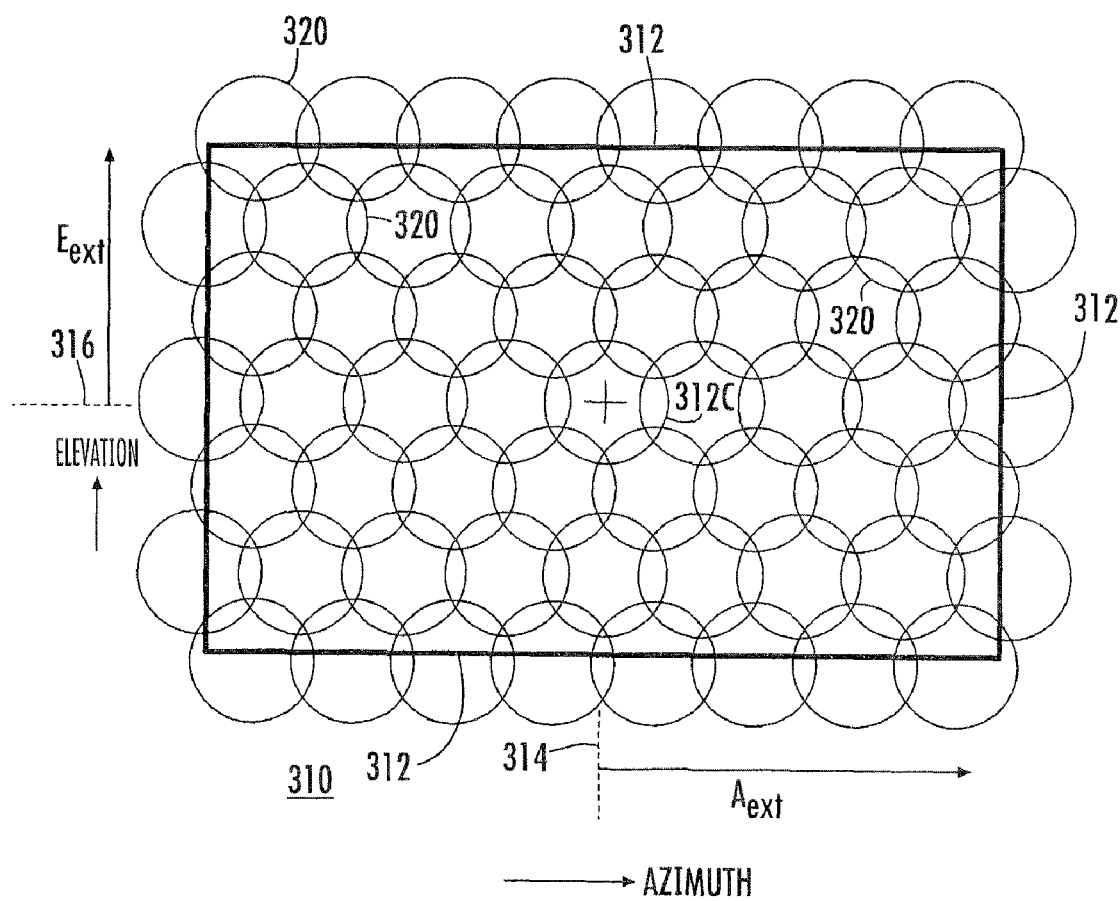
FIG. 3A is a view of a representative search face.

FIG. 3A is a representation of a search or acquisition face 310 generated by sequential beam generation by the radar sensor 16 of FIG. 2. The azimuth and elevation directions are indicated. In FIG. 3A, the nominal target azimuth and elevation, as specified by the target azimuth and elevation angle relative to ownship 14 generated by block 216, appears as a + symbol at the center of the acquisition face 310. A "cross-section" of each pencil beam is illustrated as a circle. Representative circles are designated by the number 320. The pencil beams are directed so that the beams overlap at a given power level. This overlap is indicated in FIG. 3A by the overlap of the circles. Those skilled in the art will understand that the "magnitude" of the overlap depends upon the "beamwidth" of the beams, the relative placement of the beam centers by the radar, and the attenuation or "signal" level at the overlap. Also in FIG. 3A, the overlapping beams provide coverage of a region defined by a rectangular outline 312. The azimuth "extent" of the coverage region is defined by the arrow designated $A_{ext}$, extending in the horizontal direction from a vertical centerline 314 to the outline 312. The elevation "extent" of the coverage region is defined by the arrow designated $E_{ext}$, extending in the elevation or vertical direction from a horizontal centerline 316 to the outline 312.

It should be understood that the number of pencil beams can be selected somewhat arbitrarily, in order to cover the desired acquisition face That is, due to unavoidable errors in determining the exact location of the target, and due to errors in determining the direction in ownship local coordinates, the target may not be found at the precise specified cue coordinates. In order to acquire and track the target with ownship radar, it is desirable to search a region or extent about the nominal target local coordinates. Thus, the search or acquisition face to be searched by ownship radar to acquire target 20 is defined by the reported coordinates as converted to local (ownship) coordinates, and further as affected by the reported errors accompanying the target coordinates. Thus, the extent will in general be different for each cued target.

Figure 3B:
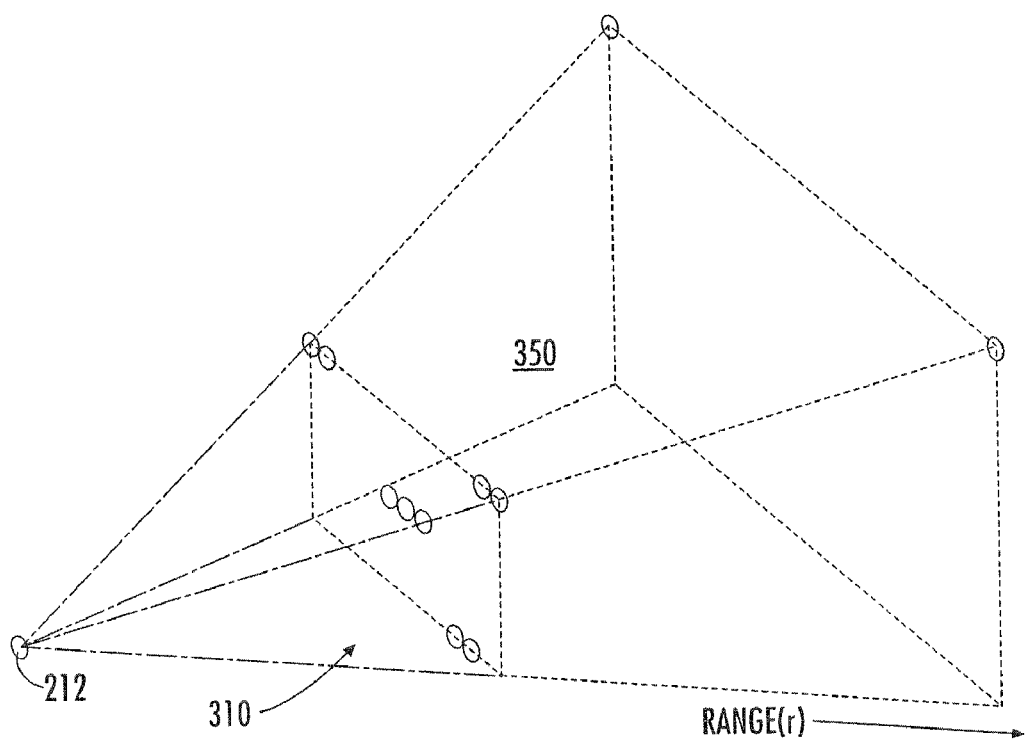
FIG. 3B is a representation of the search face of FIG. 3A with the addition of range as a parameter.

The SPY radar places an initial search beam designated 312C dead-center in the acquisition face, indicated in FIG. 3A by "+". Subsequent beams are placed to produce a regular pattern of partially overlapping beams that completely covers the acquisition face. The pattern may be described in a number of ways. One way of describing the pattern is as a line of equally spaced beam centers extending azimuthally to the edge of the search region. The line at elevation center (the line containing "+") contains the initial beam 312C and always has an odd number of beams. The azimuthal beam center separation is $2\Delta A$ where $\Delta A=(\beta/2)\cos\alpha$, where $\beta$ is the beam width and $\alpha$ is derived from the beam placement pattern, and is typically equal to 30 degrees. More specifically, $\alpha$ is equal to ½ the acute angle between the two lines that extend from the center of a radar beam to the points of intersection of the circumference of the beam with the circumference of an adjacent beam This is an angular measure, often given in degrees. The relationship of the search or acquisition face to the overall search volume associated with the face is illustrated in FIG. 3B. In FIG. 3B, the search face is designated as 310, and the range provides a third dimension which defines the search volume.

Figure 4:
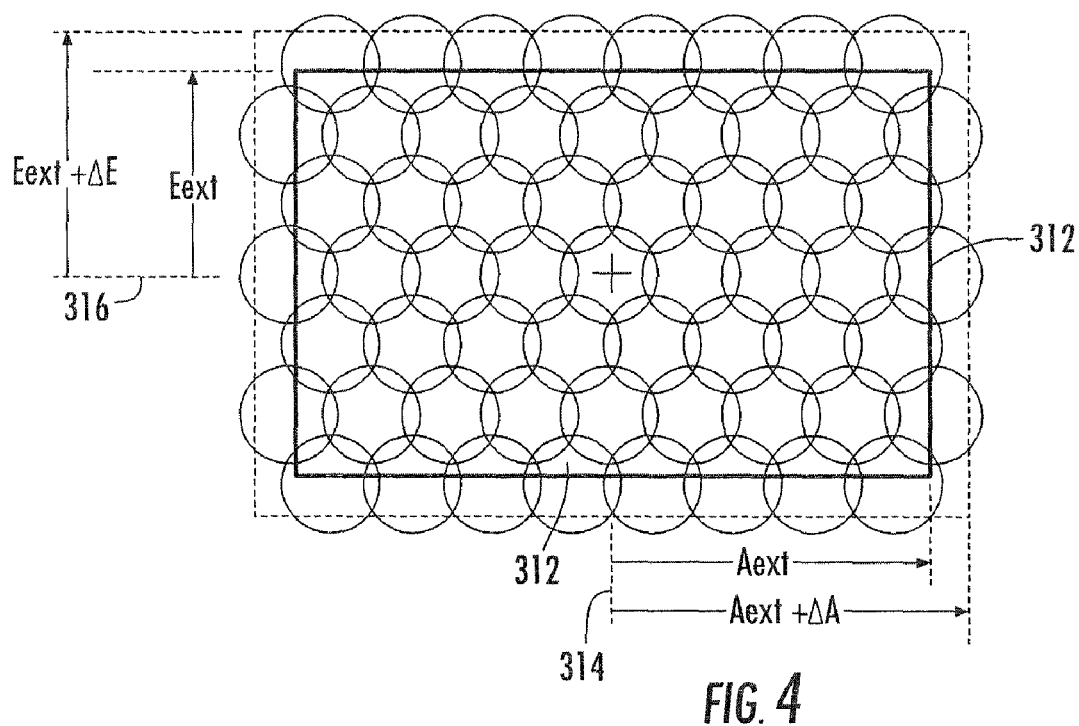
FIG. 4 is a view of the search face of FIG. 3A with additional boundaries.

According to an aspect of the invention, the azimuth extent $A_{ext}$ about the cued direction is increased or extended over and above that required by noise or errors to $A_{ext}+\Delta A$ in order to accommodate edge search, and the elevation extent $E_{ext}$ is increased or extended to $E_{ext}+\Delta E$, as illustrated in FIG. 4. A beam is "counted" as being in the search face if its center falls within the extended azimuth range. Clearly, if $$(A_{ext}+\Delta A)/2\Delta A < 1 \tag{2}$$

there is only one search beam on the azimuth line. In this case, the number of beams in a line in the azimuth direction is one. This can only occur in the rows at elevation center, and in alternate rows above and below that at elevation center. It should be noted that a column of single beams is triggered by an azimuth threshold—a special case addressed using independent processing, not described herein and of no relevance to the invention. If $$1 \leq (A_{ext}+\Delta A)/(2\Delta A) < 2 \tag{3}$$

there are 2*1+1=3 beams, because one beam is added on each side of center.

By extension, letting parameter $n_A=0, 1, \ldots$, there are $2n_A+1$ beams in the line if $$n_A \leq (A_{ext}+\Delta A)/(2\Delta A) < n_A+1 \tag{4}$$

The corresponding functional equation, that can be used to compute the number of beams in selected horizontal lines for any azimuth extent, is given by $$2n_A + 1 = 1 + 2flr\left[\frac{A_{ext}+\Delta A}{2\Delta A}\right] = 1 + 2flr\left[\frac{A_{ext}}{2\Delta A} + \frac{1}{2}\right] \tag{5}$$

where:

the floor (flr) function truncates the argument to the highest integer less than the argument; and $\Delta A$ is the spacing between beams in the azimuth direction.

For all remaining horizontal beam lines, e.g. those centered at $\pm\Delta E, \pm 3\Delta E, \ldots$, of FIG. 4, the number of beams is $2m_A$. The horizontal line of beams located $\Delta E$ above the line at elevation center in FIG. 4 has beam centers at $(1+2m_A)\Delta A$ to $A_{ext}+4\Delta A$ for $m_2=1, 2, \ldots$. Consequently, the number of beam positions in this line is always even. There are $2m_A$ beams in the line if $$m_A \leq (A_{ext}+2\Delta A)/2\Delta A < m_A+1 \qquad (6)$$

The azimuth extension $\Delta A$ provides assurance that there will be beam centers at least at $\pm\Delta A$ corresponding to $m_A=1$. Since all arguments are positive, the corresponding functional representation of the beam count and conditions is $$2m_A = 2flr\left(\frac{A_{ext}+2\Delta A}{2\Delta A}\right) = 2\left[1+flr\left(\frac{A_{ext}}{2\Delta A}\right)\right] \qquad (7)$$

Equations (5) and (7) hold also in elevation, with the simple change of $E_{ext}$ and $\Delta E$ replacing $A_{ext}$ and $\Delta A$, respectively. Thus, in elevation, $$2n_E+1 = 1+2flr\left[\frac{E_{ext}+\Delta E}{2\Delta A}\right] = 1+2flr\left[\frac{E_{ext}}{2\Delta A}+\frac{1}{2}\right] \qquad (8)$$

and $$2m_E = 2flr\left[\frac{E_{ext}+2\Delta E}{2\Delta E}\right] = 2\left[1+flr\left(\frac{E_{ext}}{2\Delta A}\right)\right] \qquad (9)$$

The number of beam positions in odd and even elevation columns or "lines" is given by $2n_E+1$ and $2m_E$, respectively. It can easily be seen from FIG. 4 that the number of azimuth lines with an odd number of beam positions is the number of beam positions in an odd-number elevation line. Similarly, the number of azimuth lines with an even number of beam positions is the number of beam positions in an even-numbered elevation line. The total number of beam positions is therefore $$N=(2n_A+1)(2n_E+1)+(2m_A)(2m_E) \qquad (10)$$

Figure 6:
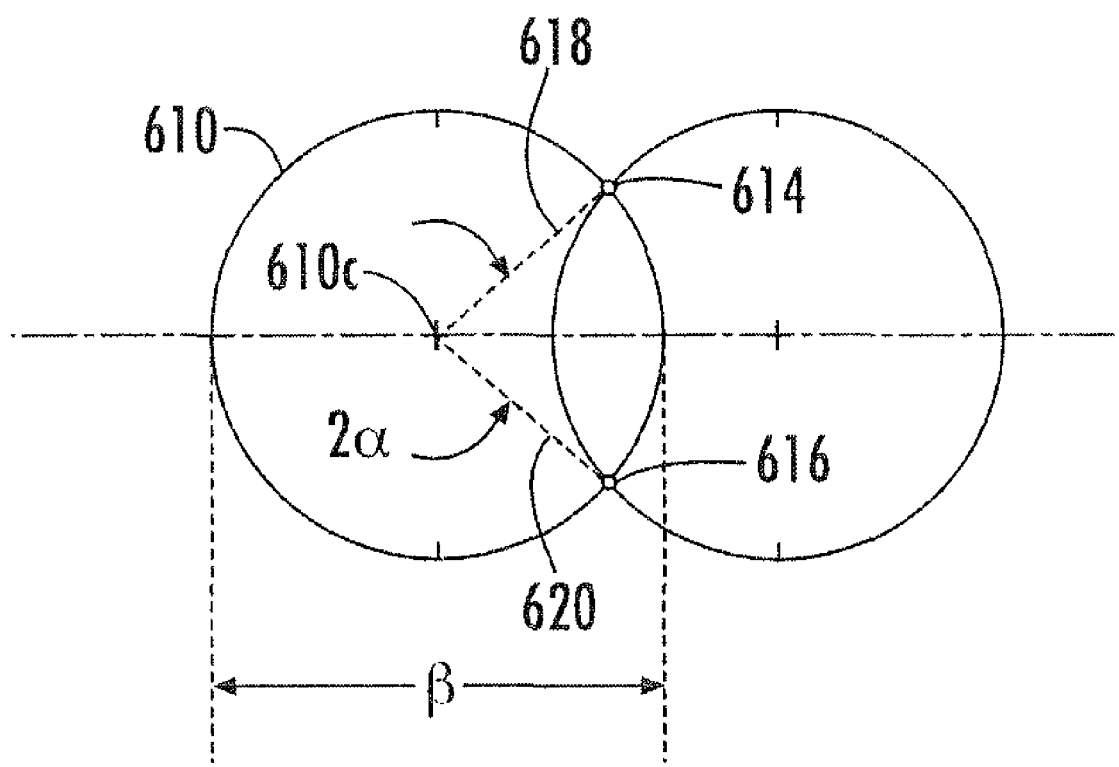
FIG. 6 illustrates geometry associated with two overlapping antenna beams.

According to an aspect of the invention, the number N of beams required to cover acquisition face is given by $$N = \left[1+2flr\left(\left(\frac{A_{ext}}{2\Delta A}\right)+\left(\frac{1}{2}\right)\right)\right]\left[1+2flr\left(\left(\frac{E_{ext}}{2\Delta E}\right)+\left(\frac{1}{2}\right)\right)\right] + \\ 4\left[1+flr\left(\frac{A_{ext}}{2\Delta A}\right)\right]\left[1+flr\left(\frac{E_{ext}}{2\Delta E}\right)\right] \qquad (1)$$

where:
$A_{ext}$ is half the total azimuth extent of the search face;
$E_{ext}$ is half the total elevation extent of the search face;
$\Delta A$ is the azimuth separation of the line of centers of adjacent horizontal columns;
$\Delta E$ is the elevation separation of the line of centers of adjacent horizontal rows;
$\Delta E=(\beta/2)(1+\sin \alpha)$;
flr is a floor function that truncates the argument to the highest integer less than the argument; and
$\Delta A=(\beta/2)\cos \alpha$, where $\beta$ is the beam width of a single beam and $\alpha$ is equal to ½ the acute angle between the two lines that extend from the center of a radar beam to the points of intersection of the circumference of the beam with the circumference of an adjacent beam. In FIG. 6, $\beta$ is indicated by the diameter of the beam 610 and the intersection of beam 610 with adjacent beam 612 is identified as points 614 and 616. The angle subtended between lines 618 and 620 extending from beam center 610C to points 614 and 616, respectively, is $2\alpha$.

As mentioned, $\Delta A$ is the azimuthal (horizontal) distance between beam centers of adjacent beam columns, that is, between the center of a beam and the center of the adjacent beam in the row above or below, and not between beam centers in a given row. Similarly, $\Delta E$ is the elevation (vertical) distance between beam centers of adjacent rows, i.e. between the center of a beam and the center of the adjacent beam in the row above or below it. In the representative acquisition face of FIG. 4, the azimuth extent is $7\Delta A+\delta$ where $\delta<\Delta A$, and the elevation extent is $2\Delta E+\epsilon$, where $\epsilon<\Delta E$. Substitution into equation (1) gives $$N=[1+2*4]*[1+2*1]+4*[1+3][1+1]=9*3+4*4*2=59$$

As can be observed by counting beams in FIG. 4, the calculated number of beams matches the actual number in the example.

Figure 5:
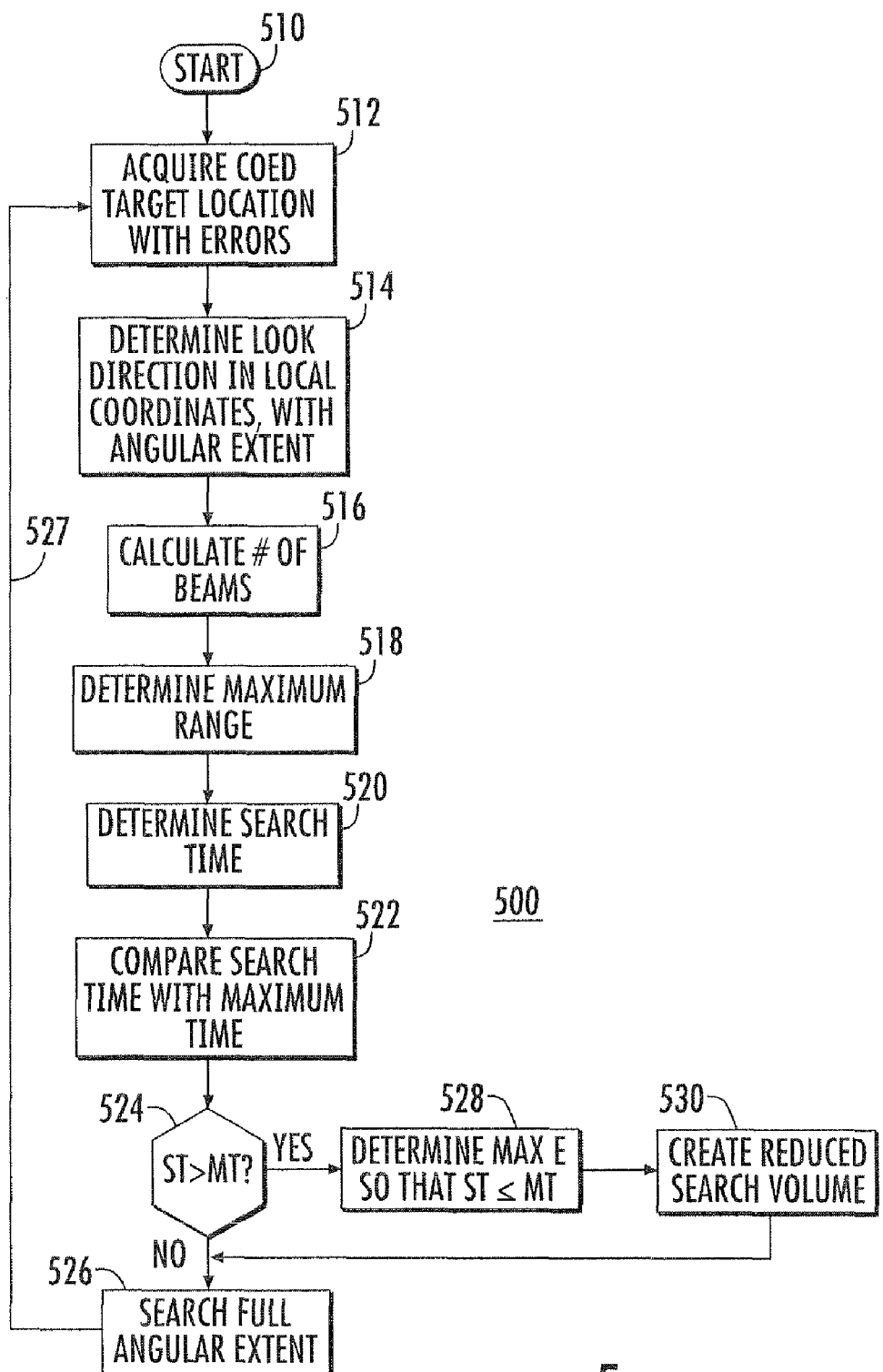
FIG. 5 is a flow chart illustrating steps according to an aspect of the invention.

FIG. 5 is a simplified logic or functional flow chart or diagram 500 illustrating a method according to an aspect of the invention. In FIG. 5, logic 500 begins at a START block 510, and the logic flows to a block 512. Block 512 represents acquisition of cued target information, together with error information. This may be accomplished as described in conjunction with FIG. 1. From block 512 of FIG. 5, the logic flows to a block 514, which represents determination from the cue information of the location of the target relative to ownship, and calculation of the azimuth and elevation extent of the acquisition face. Block 516 represents the calculation of the number of beams required to fill the acquisition face, using equation (1). It is not enough to determine the number of beams in the search region. As mentioned, it is necessary to determine the time required to accomplish the search, taking into account the number of beams and the range. The range of the search volume is determined in block 518 in order to estimate search time per beam, as known in the art. Command and decision block 216 of FIG. 2 multiplies the range-dependent time with (or by) the number of beams, as suggested by block 520 of FIG. 5, and arrives at a scan or search time for the number of beams associated with the acquisition face.

Block 522 of FIG. 5 represents the comparison of the scan or search time with the maximum allowable time. The maximum allowable time is that time at which the search aborts. A decision block 524 evaluates the comparison. The logic leaves decision block 524 by the NO output if the scan time is less than the maximum time. From the NO output of decision block 524, the logic flows to a block 526, representing the searching of the full extent. Once the search of the full extent has begun, the logic can return by a logic path 527 from block 526 to block 512 to acquire new cue information for processing during the next scan.

If decision block 524 finds that the scan of the full extent will exceed the maximum time, the logic leaves the decision block by the YES output, and flows to a further block 528.

Block 528 creates a modified search volume, by calculating a maximum search elevation such that the search time of this modified volume will be less than or equal to the maximum search time. The number of beams is not used to calculate the modified search volume. The new extent $E_{ext\_new}$ is found from (ST/MT) times $E_{ext}$, where ST is the search time of the unmodified volume, $E_{ext}$ is the extent of the unmodified acquisition face, and MT is the maximum allowed search time. From block 528, the logic 500 of FIG. 5 flows to a block 530. The elevation center of the modified acquisition face is calculated as the unmodified minimum elevation plus $E_{ext\_new}$. The logic then leaves block 530 and enters block 526, where the modified acquisition volume is searched. The logic then leaves block 526 and re-enters block 512. In block 514 the unmodified acquisition volume is updated to the current time, and re-calculated. The minimum elevation of the recalculated volume is replaced with the maximum elevation of the previous modified volume. The logic then leaves block 514 and enters block 516 to begin another iteration from block 514 through 526. These iterations continue until the entire unmodified volume is searched.

A method according to an aspect of the invention is for searching an angular acquisition region (350) of the radar acquisition or search volume about a given cued direction (+) and with a given maximum search range (r). The radar search of the designated volume is performed with sequentially generated radar beams (222) having defined beamwidths (β). The method comprises the steps of acquiring (214, 512) the nominal track position and velocity (cue information) and time, and error information describing the uncertainty in the cue information. This error information may be presented together with the cue information. From the error information, the azimuth (Az) and elevation (El) extent (the acquisition or search face) of the search volume (350) about the cue direction (+) is determined (514). If necessary, the angular extent of each beam in the azimuth and elevation directions is/are determined from the beamwidths. From the angular extents in azimuth and elevation for each beam, the number of beams required to cover the acquisition face is determined (516), as by use of equation (1). The dwell time for each of the beams is determined from the search range (518, 520). The search time is determined as the product of the number of beams multiplied by the dwell time per beam. The search time is compared (522, 524) with the maximum allowable search time, and radar scanning over the acquisition face is initiated (526) with the calculated number of beams if the search time is less than the maximum allowable search time. The acquisition or search face is partitioned into sub-search-faces (528, 530) if the search time is greater than the maximum allowable search time. When the search time has been reduced to less than the maximum allowable search time, radar scanning of each of the sub-search-faces is initiated (526). In a preferred mode of the method, the number of beams N is calculated as $$N = \left[1 + 2\,flr\left(\left(\frac{A_{ext}}{2\Delta A}\right) + \left(\frac{1}{2}\right)\right)\right]\left[1 + 2\,flr\left(\left(\frac{E_{ext}}{2\Delta E}\right) + \left(\frac{1}{2}\right)\right)\right] + 4\left[1 + flr\left(\frac{A_{ext}}{2\Delta A}\right)\right]\left[1 + flr\left(\frac{E_{ext}}{2\Delta E}\right)\right] \quad (1)$$

where:
$A_{ext}$ is half the azimuth extent of the search face;
$E_{ext}$ is half the elevation extent of the search face;
$\Delta A$ is the azimuthal beam separation at constant elevation;
$\Delta A = (\beta/2)\cos\alpha$, where β is the beam width and α is [derived from the beam placement pattern according to well-known art, typically equal to 30 degrees];
$\Delta E$ is the elevation separation of the line of centers of the horizontal rows;
$\Delta E = (\beta/2)(1 + \sin\alpha)$; and
flr is a floor function that truncates the argument to the highest integer less than the argument.

What is claimed is:

1. A method for searching an angular region of a radar search volume about a given cued direction and with a maximum range, where the search of the radar search volume is performed with sequentially applied radar beams having defined beamwidths, said method comprising the steps of:
 acquiring error information;
 from said error information, determining azimuth and elevation extents of a search face of the radar search volume about the cue direction;
 determining an angular extent of each of a plurality of radar beams in azimuth and elevation;
 from said angular extents in azimuth and elevation for each radar beam, determining a number of beams required to cover the search face of the radar search volume;
 determining a dwell time for each of the radar beams given the maximum range;
 taking a product of said number of beams multiplied by the dwell time per beam to obtain a search time;
 comparing said search time with a maximum allowable search time;
 initiating radar scanning over said search face with said number of beams if said search time is less that said maximum allowable search time; and
 partitioning said search face into sub-search-faces if said search time is greater than said maximum allowable search time, and for each of said sub-search-faces, initiating radar scanning;
 wherein said step of determining the number of beams required to cover the search face includes the calculation of $$N = \left[1 + 2\,flr\left(\left(\frac{A_{ext}}{2\Delta A}\right) + \left(\frac{1}{2}\right)\right)\right]\left[1 + 2\,flr\left(\left(\frac{E_{ext}}{2\Delta E}\right) + \left(\frac{1}{2}\right)\right)\right] + 4\left[1 + flr\left(\frac{A_{ext}}{2\Delta A}\right)\right]\left[1 + flr\left(\frac{E_{ext}}{2\Delta E}\right)\right]$$

where:
$A_{ext}$ is half the azimuth extent of the search face;
$E_{ext}$ is half the elevation extent of the search face;
$\Delta A$ is the azimuthal beam separation at constant elevation;
$\Delta A = (\beta/2)\cos\alpha$, where β is the beam width and α is equal to ½ the acute angle of the two lines that extend from the center of a radar beam to the points of intersection of the circumference of the beam with the circumference of an adjacent beam;
$\Delta E$ is the elevation separation of the line of centers of the horizontal rows;
$\Delta E = (\beta/2)(1 + \sin\alpha)$; and
flr is a floor function that truncates the argument to the highest integer less than the argument.

2. The method of claim 1, further comprising the step of obtaining cued target information together with said error information.

3. The method of claim 2, wherein said cued target information and said error information are provided from a first ship to a second ship.

4. The method of claim 3, wherein the second ship processes said cued target information received from the first ship and determines target azimuth and elevation extents of the search face.

5. The method of claim 4, wherein said step of partitioning said search face into sub-search-faces if said search time is greater than said maximum allowable search time comprises determining a modified search volume, wherein the modified search volume has a maximum search elevation defined such that the search time for the modified search volume is less than or equal to the maximum allowable search time.

6. The method of claim 1, wherein the search face comprises a two-dimensional slice of the search volume at a given range.

7. A system for searching an angular region of a radar search volume, said system comprising:
a command and decision unit for:
determining azimuth and elevation extents of a search face of the radar search volume about a cue direction from error information; and
determining an angular extent of each of a plurality of radar beams in azimuth and elevation; and
a radar beam controller for:
from said angular extents in azimuth and elevation for each radar beam, determining a number of beams required to cover the search face of the search volume;
determining a dwell time for each of the radar beams given a maximum range;
taking a product of said number of beams multiplied by the dwell time per beam to obtain a search time;
comparing said search time with a maximum allowable search time;
initiating radar scanning over said search face with said number of beams if said search time is less that said maximum allowable search time; and
partitioning said search face into sub-search-faces if said search time is greater than said maximum allowable search time, and for each of said sub-search-faces, initiating radar scanning.

8. The system of claim 7, wherein said step of determining the number of beams required to cover the search face includes a calculation comprising:

$$N = \left[1 + 2\,flr\left(\left(\frac{A_{ext}}{2\Delta A}\right) + \left(\frac{1}{2}\right)\right)\right]\left[1 + 2\,flr\left(\left(\frac{E_{ext}}{2\Delta E}\right) + \left(\frac{1}{2}\right)\right)\right] + 4\left[1 + flr\left(\frac{A_{ext}}{2\Delta A}\right)\right]\left[1 + flr\left(\frac{E_{ext}}{2\Delta E}\right)\right]$$

where:
$A_{ext}$ is half the azimuth extent of the search face;
$E_{ext}$ is half the elevation extent of the search face;
$\Delta A$ is the azimuthal beam separation at constant elevation;
$\Delta A = (\beta/2)\cos\alpha$, where $\beta$ is the beam width and $\alpha$ is equal to ½ the acute angle of the two lines that extend from the center of a radar beam to the points of intersection of the circumference of the beam with the circumference of an adjacent beam;
$\Delta E$ is the elevation separation of the line of centers of the horizontal rows;
$\Delta E = (\beta/2)(1+\sin\alpha)$; and
flr is a floor function that truncates the argument to the highest integer less than the argument.

9. The system of claim 7, wherein said step of partitioning said search face into sub-search-faces if said search time is greater than said maximum allowable search time comprises determining a modified search volume, wherein the modified search volume has a maximum search elevation defined such that the search time for the modified search volume is less than or equal to the maximum allowable search time.

10. The system of claim 7, wherein the search face comprises a two-dimensional slice of the search volume at a given range.

11. The system of claim 7, further comprising a first ship and a second ship, the first ship providing the second ship with the error information and the second ship including the command and decision unit and the beam controller.

12. The system of claim 11, wherein the first ship further provides the second ship with cued target information.

13. The system of claim 12, wherein the command and decision unit uses the cued target information to determine the azimuth and elevation extents of the search face.

14. A method for searching a portion of a radar search volume, said method comprising the steps of:
determining azimuth and elevation extents of a search face of the search volume about the cue direction from error information;
determining an angular extent of each of a plurality of radar beams in azimuth and elevation;
from said angular extents in azimuth and elevation for each radar beam, determining a number of beams required to cover the search face of the radar search volume;
determining a dwell time for each of the radar beams given a maximum search range of said plurality of radar beams;
obtaining a search time by multiplying said number of beams by the dwell time per beam;
comparing said search time with a maximum allowable search time;
initiating radar scanning of the search face if said search time is less than said maximum allowable search time; and
reducing a size of said search face if said search time is greater than said maximum allowable search time, and for said reduced size search face, initiating radar scanning.

15. The method of claim 14, wherein said step of determining the number of beams required to cover the search face includes a calculation comprising:

$$N = \left[1 + 2\,flr\left(\left(\frac{A_{ext}}{2\Delta A}\right) + \left(\frac{1}{2}\right)\right)\right]\left[1 + 2\,flr\left(\left(\frac{E_{ext}}{2\Delta E}\right) + \left(\frac{1}{2}\right)\right)\right] + 4\left[1 + flr\left(\frac{A_{ext}}{2\Delta A}\right)\right]\left[1 + flr\left(\frac{E_{ext}}{2\Delta E}\right)\right]$$

where:
$A_{ext}$ is half the azimuth extent of the search face;
$E_{ext}$ is half the elevation extent of the search face;
$\Delta A$ is the azimuthal beam separation at constant elevation;
$\Delta A = (\beta/2)\cos\alpha$, where $\beta$ is the beam width and $\alpha$ is equal to ½ the acute angle of the two lines that extend from the center of a radar beam to the points of intersection of the circumference of the beam with the circumference of an adjacent beam;
$\Delta E$ is the elevation separation of the line of centers of the horizontal rows;
$\Delta E = (\beta/2)(1+\sin\alpha)$; and
flr is a floor function that truncates the argument to the highest integer less than the argument.

16. The method of claim 14, wherein the azimuth and elevation extents of the search face are determined from cued target information.

17. The method of claim 16, wherein said step of reducing a size of said search face comprises determining a modified search volume, wherein the modified search volume has a maximum search elevation defined such that the search time for the modified search volume is less than or equal to the maximum allowable search time.

18. The method of claim 17, wherein the search face comprises a two-dimensional slice of the search volume at a given range.

* * * * *